US009014459B2

(12) United States Patent
Xiang et al.

(10) Patent No.: US 9,014,459 B2
(45) Date of Patent: Apr. 21, 2015

(54) IDENTIFICATION METHOD FOR VALUABLE FILE AND IDENTIFICATION DEVICE THEREOF

(75) Inventors: Tuowen Xiang, Guangzhou (CN); Mengtao Liu, Guangzhou (CN); Ming Li, Guangzhou (CN); Chaoyang Xu, Guangzhou (CN)

(73) Assignee: GRG Banking Equipment Co., Ltd., Guangzhou (CN)

( * ) Notice: Subject to any disclaimer, the term of this patent is extended or adjusted under 35 U.S.C. 154(b) by 0 days.

(21) Appl. No.: 13/883,994

(22) PCT Filed: Jul. 5, 2012

(86) PCT No.: PCT/CN2012/078218
§ 371 (c)(1),
(2), (4) Date: May 8, 2013

(87) PCT Pub. No.: WO2013/040933
PCT Pub. Date: Mar. 28, 2013

(65) Prior Publication Data

US 2014/0233827 A1 Aug. 21, 2014

(30) Foreign Application Priority Data

Sep. 19, 2011 (CN) .......................... 2011 1 0278160

(51) Int. Cl.

| | |
|---|---|
| ***G06K 9/00*** | (2006.01) |
| ***G07D 7/20*** | (2006.01) |
| ***G07D 7/12*** | (2006.01) |

(52) U.S. Cl.
CPC .. *G07D 7/20* (2013.01); *G07D 7/12* (2013.01); *G07D 7/2008* (2013.01); *G07D 7/2016* (2013.01); *G07D 7/2058* (2013.01)

(58) Field of Classification Search
None
See application file for complete search history.

(56) References Cited

U.S. PATENT DOCUMENTS

| | | | | |
|---|---|---|---|---|
| 6,731,785 | B1 * | 5/2004 | Mennie et al. ................ | 382/135 |
| 8,781,206 | B1 * | 7/2014 | Yacoubian et al. ........... | 382/135 |

(Continued)

FOREIGN PATENT DOCUMENTS

| | | | |
|---|---|---|---|
| CN | 1781114 | A | 5/2006 |
| CN | 101013516 | A | 8/2007 |

(Continued)

OTHER PUBLICATIONS

Search Report regarding a European counterpart application 12833523.9, 8 pages.

*Primary Examiner* — Nancy Bitar
(74) *Attorney, Agent, or Firm* — Kilpatrick Townsend & Stockton LLP

(57) ABSTRACT

An identification method for a valuable file and an identification device thereof. The method includes the following steps: (1) acquiring an original infrared image, type, denomination and orientation data of a current valuable file; (2) obtaining size data and infrared characteristic data of a corresponding standard valuable file; (3) applying an image projection conversion technology, and correcting the original infrared image to form a second infrared image matched with the size of the standard valuable file; (4) obtaining the infrared characteristic data of the current valuable file from the second infrared image and comparing same with that of the standard valuable file to identify whether the current valuable file is true or false; and (5) outputting the identification result. This method and device correct the original infrared image, reducing the quality acquisition requirements thereof, and can collect an image directly using a camera on a simply equipped mobile device, improving identification accuracy.

14 Claims, 7 Drawing Sheets

(56) References Cited

U.S. PATENT DOCUMENTS

| | | | | |
|---|---|---|---|---|
| 8,787,652 | B1 * | 7/2014 | Jones et al. | 382/135 |
| 2007/0105892 | A1 * | 5/2007 | Graupe et al. | 514/302 |
| 2007/0154099 | A1 | 7/2007 | He et al. | |
| 2009/0087077 | A1 | 4/2009 | Nireki | |
| 2009/0324053 | A1 | 12/2009 | Ross et al. | |
| 2010/0144387 | A1 | 6/2010 | Chou | |
| 2010/0322503 | A1 * | 12/2010 | Manabe | 382/135 |
| 2011/0001994 | A1 * | 1/2011 | Matsuda | 358/1.9 |
| 2011/0064279 | A1 | 3/2011 | Uno | |

FOREIGN PATENT DOCUMENTS

| | | | |
|---|---|---|---|
| CN | 102306415 | A | 1/2010 |
| CN | 101726855 | A | 6/2010 |
| CN | 101727696 | A | 6/2010 |
| CN | 101 908 241 | A | 12/2010 |
| CN | 101900737 | A | 12/2010 |
| CN | 101933052 | A | 12/2010 |
| CN | 102324134 | A | 1/2012 |
| DE | 10 2007 019107 | A1 | 10/2008 |
| WO | 2007105892 | A1 | 9/2007 |
| WO | 2010124963 | A1 | 11/2010 |

* cited by examiner

IDENTIFICATION METHOD FOR VALUABLE FILE AND IDENTIFICATION DEVICE THEREOF

This application is a National Stage application of PCT international application PCT/CN2012/078218, filed on Jul. 5, 2012 which claims the priority of Chinese Patent Application No. 201110278160.9, entitled "IDENTIFICATION METHOD FOR VALUABLE FILE AND IDENTIFICATION DEVICE THEREOF", filed on Sep. 19, 2011 with State Intellectual Property Office of PRC, which is hereby incorporated by reference in its entirety.

FIELD OF THE INVENTION

The present invention relates to a method and device for distinguishing a value document, and in particular to a method and device for distinguishing a value document by distinguishing an infrared image of the valuable document on a mobile device with an infrared photography function.

BACKGROUND OF THE INVENTION

Although various bank cards are widely used now, the circulation of cash remains predominant. Some criminals use high-tech means to imitate and forge value documents such as banknotes, causing serious harm to our society. In order to prevent the circulation of imitated value documents such as fake banknotes, there are increasing demands for accuracy and portability of value document distinguishing device. However, nowadays, distinguishing devices with relatively high accuracy mainly include large scale devices such as Banknote-Testing Device and ATM, which have high price and less portability, and therefore the application places of these devices are greatly restricted. In order to solve this problem, some simple devices such as fluorescence pen are emerged on the market; however, these portable devices have difficulties in detecting and distinguishing a value document.

A problem the skilled in the prior art encountered is: if the accuracy of a value document distinguishing device is to be improved, the accuracy for capturing images by the value document distinguishing device must be ensured. For this end, the value document distinguishing device needs to use a stable single light source to capture image, so as to improve the sharpness and reality of a value document image, therefore, the hardware structure and application places of the value document distinguishing device are restricted, and the value document distinguishing device with high accuracy has complex structure, high price and less portability. A value document distinguishing device with simple structure, low price and portability, however, has less accuracy for distinguishing.

Therefore, there is a need for a value document distinguishing device with high accuracy and portability.

SUMMARY OF THE INVENTION

An object of the present invention is to provide a value document distinguishing method which is easy to operate and has high accuracy.

An object of the present invention is to provide a value document distinguishing device with high accuracy and portability.

In order to achieve the above objects, the present invention provides a method for distinguishing a value document, and the method includes the following steps:

(1) acquiring an original infrared image, type, denomination and orientation data of a current value document;

(2) obtaining size data and infrared characteristic data of a standard value document corresponding to the current value document from a storage module according to the type, denomination and orientation data of the current value document;

(3) performing calibration process on the original infrared image using image projection transformation technology according to the size data of the standard value document to form a second infrared image, the size of the second infrared image being matched with the size of the standard value document;

(4) obtaining infrared characteristic data of the current value document from the second infrared image, and comparing the obtained infrared characteristic data of the current value document with the infrared characteristic data of the corresponding standard value document, to distinguish whether the current value document is fake; and (5) outputting a distinguishing result.

Compared with the prior art, in the value document distinguishing method of the present invention, the captured original infrared image is first calibrated using the projection transformation technology; making the original infrared image of the captured current value document match with the size in size data of the stored standard value document template. On one hand, in the present invention it is therefore feasible to directly capture the original infrared image of the current value document using a normal camera device with a infrared filter, without taking an image using a stable signal light source at a site with simple background, and thus the requirement for the original image is low; on the other hand, the original infrared image can be taken from any angle when capturing the original infrared image according to the present invention, and thus the operation is simple; furthermore, according to the present invention, the current value document is distinguished after the captured image is calibrated by the projection calibration module, and thus the accuracy of distinguishing is high.

Preferably, step (1) specifically includes the following steps:

(11) capturing the original infrared image of the current value document; and

(12) obtaining the type, denomination and orientation data of the current value document by way of comparing the original infrared image of the current value document with data stored in the storage module for identification or by way of input from an interactive interface.

Preferably, in step 2, the original infrared image needs to be pre-processed before performing the calibration process on the original infrared image, and step 2 specifically includes the following steps:

(11a) performing image smoothing process on the original infrared image using Gaussian smoothing technology;

(11b) performing recovery process on the original infrared image using image recovery technology of partial differential equation;

(11c) calculating four vertex coordinates of the original infrared image to obtain a value document area; and (11d) segmenting out the value document area on which the calibration process is to be performed.

After the recovery process, the processed original infrared image is further close to the image of the standard value document, and the accuracy for distinguishing the infrared image is increased. The Gaussian smoothing technology can not only de-noise the infrared image effectively but can also decrease fuzziness in the smoothing process. Image recovery technology of partial differential equation may recover the captured original infrared image to an optimal estimated value. Locating and segmenting process effectively increases the accuracy of infrared image projection calibration.

Preferably, step (3) specifically includes the following steps:

(31) establishing a template according to the size data of the standard value document;

(32) calculating a mapping relationship between the original infrared image and the template by using bilinear equations; and

(33) mapping pixel values of respective points in the original infrared image onto the template according to the mapping relationship, to form a second infrared image.

According to the present invention, using bilinear equations to calculate the mapping relationship, the mapping relationship between coordinates of respective points in the original infrared image and the template can be determined only by finding out four pairs of corresponding points between the original infrared image and the template, taking the four pairs of corresponding points as reference points to establish the bilinear equations, and figuring out eight parameters of the bilinear equations, and thus the computation is simple; performing projection calibration process on the original infrared image according to the mapping relationship may maximally recover the original infrared image, thereby avoiding image distortion. Furthermore, the reference points may be vertexes of the image, or other characteristic points.

Preferably, step (4) specifically includes the following steps:

(41) Obtaining infrared characteristic data from at least one characteristic area in the second infrared image to form first infrared characteristic data, and obtaining infrared characteristic data from a corresponding area in the standard value document to form second infrared characteristic data; and

(42) comparing the first infrared characteristic data and the second infrared characteristic data to obtain a comparison value, determining whether the comparison value meets a set requirement, and determining the current value document is legal if the comparison value meets the set requirement and determining the current value document illegal if the comparison value does not meet the set requirement.

Preferably, the infrared characteristic data includes at least one of the following values: a gradient characteristic value of gray value of the infrared image, an average value of gray value of the infrared image, a variance of gray value of the infrared image.

Preferably, when the infrared characteristic data is the gradient characteristic value of gray value of the infrared image, the determining includes:

(51) calculating a gradient value $G_\Omega(x,y)$ of gray value of the current value document and a gradient value $G_0(x,y)$ of gray value of the corresponding standard value document;

(52) calculating the number $N_g$ of $G_\Omega(x)$ that meets $G_\Omega(x,y)>TH_g$, calculating the number $N_0$ of $G_0(x,y)$ that meets $G_0(x,y)>TH_g$, where $TH_g$ is a gradient threshold, $1.0<TH_g<25.0$;

(53) calculating a gradient comparison value N, $N=N_g/N_0$; and

(54) determining the magnitude of the gradient comparison value N, determining that the current value document meets a gradient rule if $0.95\leq N\leq 1.05$, or otherwise determining that the current value document does not meet the gradient rule, and then outputting a corresponding gradient legal/illegal signal.

Preferably, when the infrared characteristic data is the average value of gray value of the infrared image, the determining includes:

(61) calculating an average value $M_\Omega$ of gray value of the current value document and an average value $M_0$ of gray value of the corresponding standard value document;

(62) calculating an average comparison value M, $M=M_g/M_0$; and

(63) determining the magnitude of the comparison value M, determining that the current value document meets an average rule if $0.90\leq M\leq 1.10$, or otherwise determining that the current value document does not meet the average rule, and then outputting a corresponding average legal/illegal signal.

Preferably, when the infrared characteristic data is the variance of gray value of the infrared image, the determining includes:

(71) calculating a variance $V_\Omega$ of gray value of the current value document and a variance $V_0$ of gray value of the corresponding standard value document;

(72) calculating a variance comparison value V, $V=V_g/V_0$; and

(73) determining the magnitude of V, determining that the current value document meets a variance rule if $0.80\leq V\leq 1.25$, or otherwise determining that the current value document does not meet the variance rule, and then outputting a corresponding variance legal/illegal signal.

In order to achieve the above objects, the present invention further provides a value document distinguishing device for distinguishing whether a current value document is fake, the device includes:

a collection module for obtaining an original infrared image, type, denomination and orientation data of the current value document;

a storage module for storing size data and infrared characteristic data of a standard value document;

a projection calibration module for performing calibration process on the original infrared image using image projection transformation technology according to the size data of the standard value document to form a second infrared image, the size of the second infrared image being matched with the size of the standard value document;

a process module for obtaining size data and infrared characteristic data of the standard value document corresponding to the current value document from the storage module according to the type, denomination and orientation data of the current value document; obtaining infrared characteristic data of the current value document from the second infrared image, and comparing the obtained infrared characteristic data of the current value document with the infrared characteristic data of the standard value document, to obtain a legal/illegal document signal for the current value document;

an output module for outputting the legal/illegal document signal;

a control module for controlling and coordinating data transfer among respective modules in the value document distinguishing device.

Compared with the prior art, the value document distinguishing device of the present invention is provided with a projection calibration module, which may make the captured infrared image of the current value document has a size consistent with that in size data of a stored standard value document template by using image projection transformation technology. Therefore, on one hand, in the invention, it is feasible to capture the original infrared image that meets the requirement of the present invention only by using a camera device with a infrared filter as a collection module, and the distinguishing device according to the present invention may be directly applied to some simple mobile devices such as mobile phone, web-camera and camera that are provided with infrared shooting function, and thus it is portable and cheap; on the other hand, according to the present invention, the original infrared image can be shot from any angle when capturing the original infrared image of the current value document, calibration may be performed by the projection calibration module if a two-dimensional oblique view is obtained, and thus the operation is simple; furthermore, there must be some errors no matter how stable the collection device in the prior art is and how proper the captured infrared image is, while according to the present invention, the captured image is calibrated by a projection calibration module, and the accuracy of the distinguishing unit is effectively improved, hence the accuracy of distinguishing according to the present invention is improved.

Preferably, the collection module includes:

an infrared camera device for capturing and obtaining the original infrared image of the current value document; and an interactive interface for collecting and obtaining the type, denomination and orientation data of the current value document inputted from outside.

Preferably, the collection module includes:

an infrared camera device for capturing and obtaining the original infrared image of the current value document; and a comparison and identification unit for comparing the original infrared image of the current value document with the infrared characteristic data of the standard value document stored in the storage module to obtain the type, denomination and orientation data of the current value document.

Preferably, the value document distinguishing device further includes a pre-process module for pre-processing the original infrared image, the preprocess module includes the following units:

an image de-noise unit for performing image smoothing process on the captured original infrared image;

an image recovery unit for performing recovery process on the original infrared image;

an image locating unit for calculating tour vertex coordinates of the original infrared image to obtain a value document area; and an image segmentation unit for segmenting out the value documents area on which to the calibration process is to be performed.

Preferably, the projection calibration module includes:

a template process unit for establishing a template using the size data of the standard value document;

a parameter computation unit for calculating a mapping relationship between the original infrared image and the template by using bilinear equations; and a pixel substitution unit for mapping pixel values of respective points in the original infrared image onto the template according to the mapping relationship, and forming the second infrared image after the calibration process.

According to the present invention, through taking four pairs of corresponding points in the original infrared image and the template as reference points, establishing bilinear equations, and working out eight parameters of the bilinear equations, the mapping relationship between coordinates of respective points in the original infrared image and the template can be determined, and therefore the process is simple and rapid; performing a projection calibration on the original infrared image according to the mapping relationship may make the original infrared image has a size matched with the template size, and thus maximally recover the infrared image and avoid image distortion. The reference points may be vertexes of the image or other characteristic points.

Preferably, the process module includes:

a data selection unit for obtaining the size data and the infrared characteristic data of the standard value document corresponding to the current value document from the storage module according to the type, denomination and orientation data of the current value document; and a comparison process unit for obtaining the infrared characteristic data of the current value document from the second infrared image, and comparing the obtained infrared characteristic data of the current value document with the infrared characteristic data of the standard value document to obtain a legal/illegal document signal for the current value document.

Preferably, the comparison process unit includes:

a data acquisition unit for obtaining the infrared characteristic data from at least one infrared characteristic area in the second infrared image to form first infrared characteristic data, and obtaining the infrared characteristic data from a corresponding area in the standard value document to form second infrared characteristic data;

a data comparison unit which includes at least one of the following three units:

a gradient comparison unit for calculating gradient characteristic values of gray values of the current value document and the standard value document according to the first infrared characteristic data and the second infrared characteristic data, comparing the gradient characteristic values to obtain a gradient comparison value, determining whether the gradient comparison value meets a set requirement, and obtaining a gradient legal/illegal signal;

an average value comparison unit for calculating average values of gray values of the current value document and the standard value document according to the first infrared characteristic data and the second infrared characteristic data, comparing the average values to obtain an average comparison value, determining whether the average comparison value meets a set requirement, and obtaining an average legal/illegal signal; and a variance comparison unit for calculating variances of gray values of the current value document and the standard value document according to the first infrared characteristic data and the second infrared characteristic data, comparing the variances to obtain a variance comparison value, determining whether the variance comparison value meets a set requirement, and obtaining a variance legal/illegal signal; and a fake determination unit for determining whether the current value document is fake according to the gradient legal/illegal signal, the average legal/illegal signal and/or the variance legal/illegal signal, and obtaining the legal/illegal document signal for the current value document.

DETAILED DESCRIPTION OF THE INVENTION

In order to illustrate the technical contents, structural features, objects to be achieved and effects of the present invention in detail, a detail description will be made in the following in conjunction with embodiments and drawings.

Figure 4:
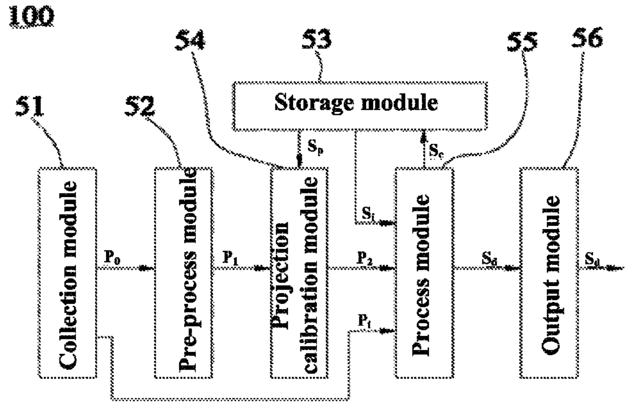
FIG. 4 is a structural diagram of a value document distinguishing device according to the present invention.
Figure 8:
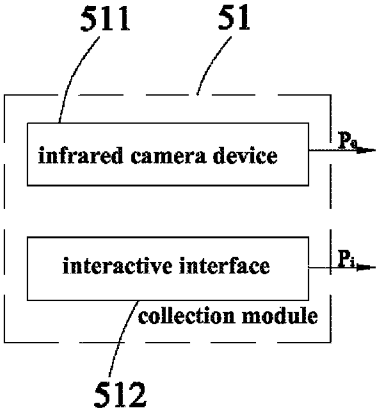
FIG. 8 is a structural diagram of a collection module in the value document distinguishing device according to the present invention.

Referring to FIGS. 4 and 8, a value document distinguishing device 100 according to the present invention is used for distinguishing whether a value document is fake. The device includes a collection module 51, a storage module 53, a projection calibration module 54, a process module 55, an output module 56 and a control module (not shown). The collection module 51 is used for obtaining an original infrared image $P_0$ of a current value document and type, denomination and orientation data $P_i$ of the current value document; the storage module 53 is used for storing size data $S_p$ of a standard value document and infrared characteristic data $S_i$ of the standard value document; the projection calibration module 54 is used for performing calibration process on the original infrared image $P_0$ using image projection transformation technology according to the size data $S_p$ of the standard value document to form a second infrared image $P_2$, where the size of the second infrared image $P_2$ is matched with the size data $S_p$ of the standard value document; the process module 55 is used for obtaining the size data $S_p$ and the infrared characteristic data $S_i$ of the standard value document corresponding to the current value document from the storage module 55 according to the type, denomination and orientation data $P_i$ of the current value document; the process module 55 is further used for obtaining infrared characteristic data of the current value document from the second infrared image $P_2$, and comparing the obtained infrared characteristic data of the current value document with the infrared characteristic data $S_i$ of the standard value document, to obtain a legal/illegal document signal $S_d$ for the current value document; the output module is used for outputting the legal/illegal document signal $S_d$; the control module is used for controlling and coordinating data transfer among respective modules in the value document distinguishing device 100.

Referring to FIG. 8, the collection module 51 includes an infrared camera device 511 and an interactive interface 512. The infrared camera device 511 is used for capturing and obtaining the original infrared image $P_0$ of the current value document; the interactive interface 512 is used for collecting and obtaining the type, denomination and orientation data $P_i$ of the current value document inputted from outside. Specifically; a keyboard, a touch screen or a button may be selected as the interactive interface 512.

Figure 9:
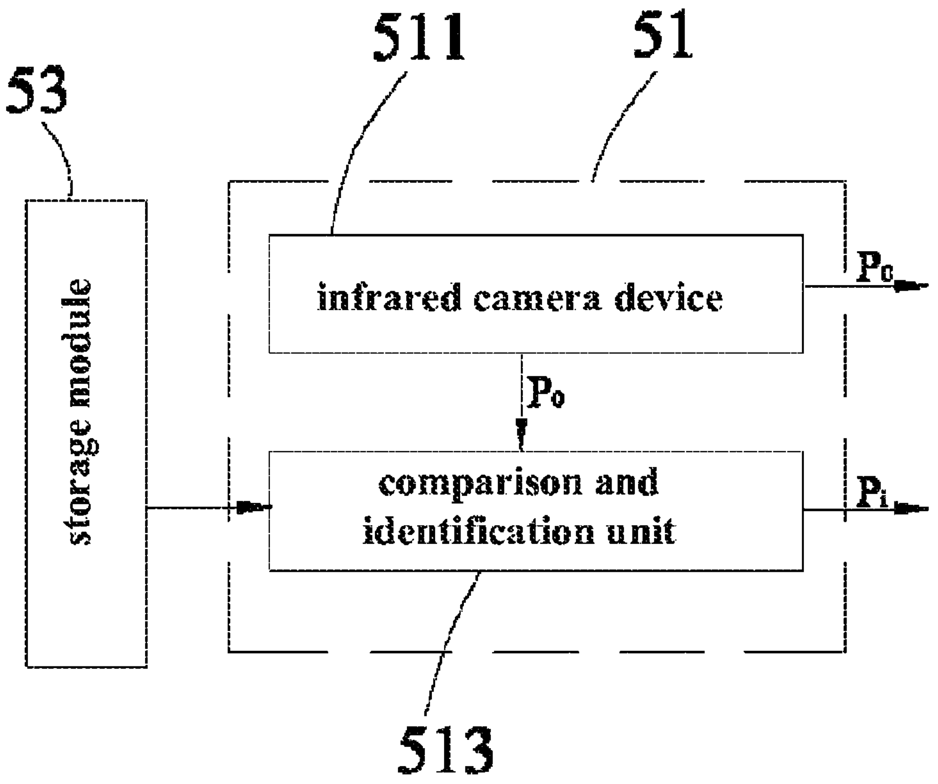
FIG. 9 is another structural diagram of a collection module in the value document distinguishing device according to the present invention.

Reaming to FIG. 9, in another embodiment, the collection module includes an infrared camera device 511 and a comparison and identification unit 513. The infrared camera device 511 is used for capturing and Obtaining the original infrared image $P_0$ of the current value document; the comparison and identification unit 513 is used for comparing the original infrared image $P_0$ of the current value document with data in the storage module 53, to obtain the type, denomination and orientation data $P_i$ of the current value document.

Figure 6:
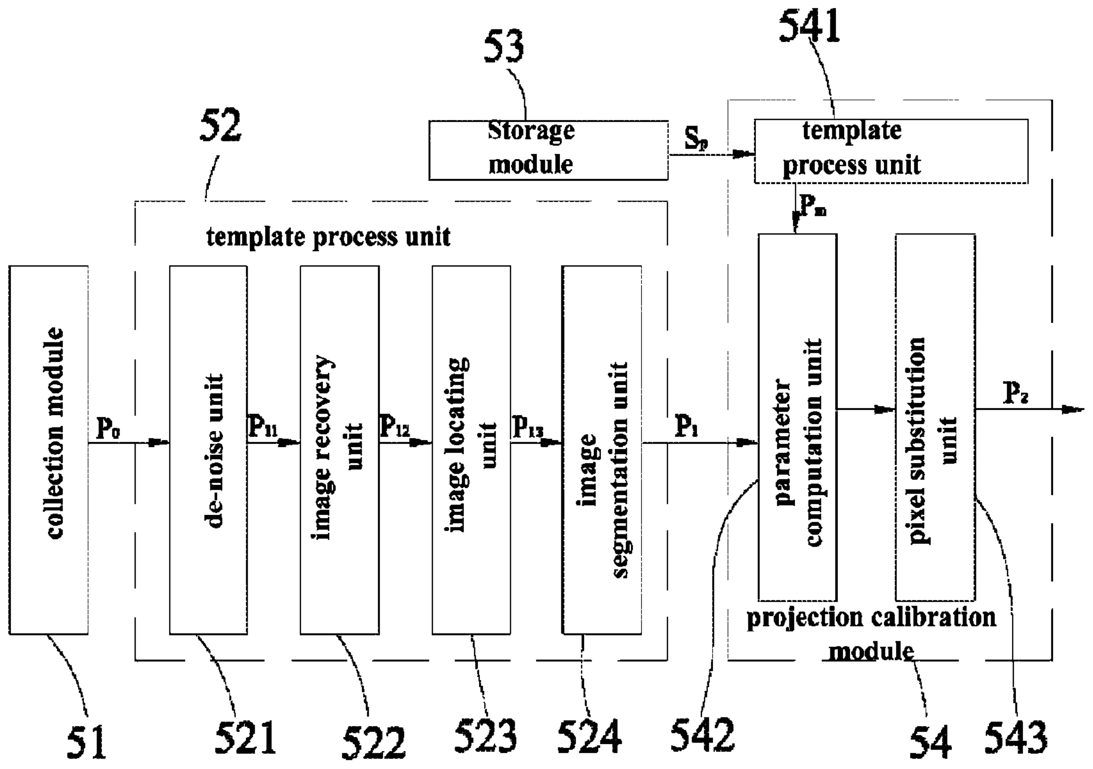
FIG. 6 is a structural diagram of a pre-process module and a projection calibration module in the value document distinguishing device according to the present invention.

Referring to FIG. 6, the value document distinguishing device 100 further includes a pre-process module 52 for preprocessing the original infrared image $P_0$ to obtain a preprocessed original infrared image $P_1$. The pre-process module 52 includes an image de-noise unit 521, an image recovery unit 522, an image locating unit 523 and an image segmentation unit 524. The image de-noise unit 521 is used for performing image smoothing process on the captured original infrared image $P_0$ to obtain an original infrared graphic $P_{11}$; the image recovery unit 522 is used for performing recovery process on the original infrared image $P_{11}$ to obtain an original infrared graphic $P_{12}$; the image locating unit 523 is used for calculating four vertex coordinates of the original infrared image $P_{12}$ to obtain a value document area $P_{13}$; the image segmentation unit 524 is used for segmenting out the value document area. $P_{13}$ to obtain the pre-processed original infrared image $P_1$ and outputting the pre-processed original infrared image $P_1$ to the projection calibration module 54 for calibration process.

Referring to FIG. 6, the projection calibration module 54 includes a template process unit 541, a parameter computation unit 542 and a pixel substitution unit 543. The template process unit 541 establishes a template $P_m$ using the size data $S_p$ of the standard value document; the parameter computation unit 542 calculates a mapping relationship between the original infrared image $P_1$ and the template $P_m$ using bilinear equations; the pixel substitution unit 543 maps pixel values of respective points in the original infrared image onto the template $P_m$ according to the mapping relationship, and forms the second infrared image $P_2$ after the calibration process.

Figure 5:
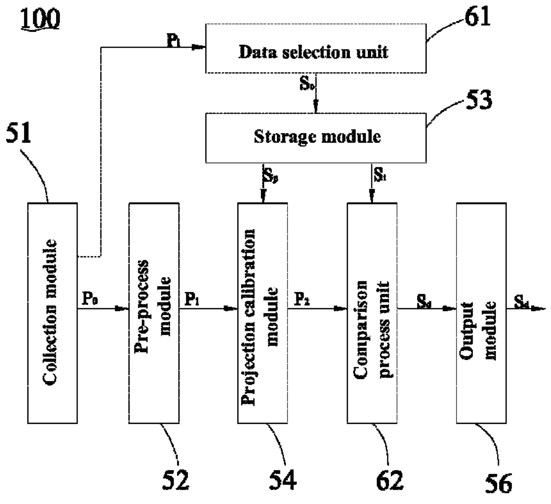
FIG. 5 is another structural diagram of a value document distinguishing device according to the present invention.
Figure 7:
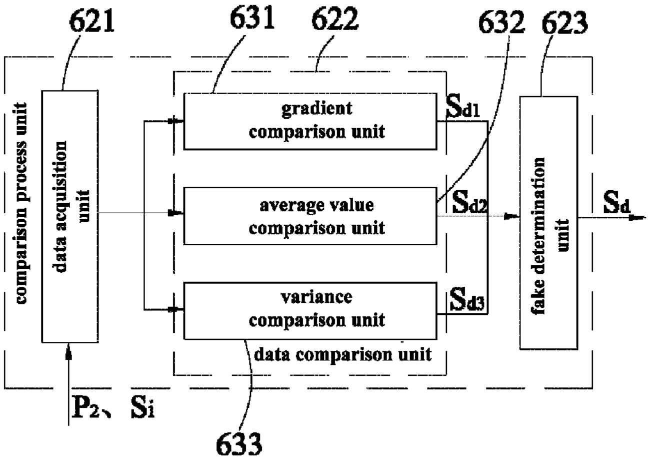
FIG. 7 is a structural diagram of a comparison process unit in the value document distinguishing device shown in FIG. 5.

Referring to FIGS. 5 and 7, the process module 55 includes a data selection unit 61 and a comparison process unit 62. The data selection unit 61 issues a data selection command $S_c$ to the storage module 53 according to the type, denomination and orientation data $P_i$ of the current value document; the control storage module 53 outputs the size data $S_p$ and the infrared characteristic data $S_i$ of the standard value document corresponding to the current value document; the comparison process unit 62 obtains infrared characteristic data of the current value document from the second infrared image $P_2$ and compares the obtained infrared characteristic data of the current value document with the infrared characteristic data $S_i$ of the standard value document, to obtain a legal/illegal document signal $S_d$ with respect to the current value document.

Referring to FIG. 7, the comparison process unit 62 includes a data acquisition unit 621, a data comparison unit 622 and a fake determination unit 623. The data acquisition unit 621 is used for obtaining infrared characteristic data from at least one infrared characteristic area in the second infrared image $P_2$ to form first infrared characteristic data, and obtaining infrared characteristic data from a corresponding area in the standard value document to form second infrared characteristic data. The data comparison unit 622 includes at least one of a gradient comparison unit 631, an average value comparison unit 632 and a variance comparison unit 633. The gradient comparison unit 631 calculates gradient characteristic values of gray values of the current value document and the standard value document according to the first infrared characteristic data and the second infrared characteristic data, compares the gradient characteristic values to obtain a gradient comparison value, determines whether the gradient comparison value meets a set requirement, and obtains a gradient legal/illegal signal $S_{d1}$; the average value comparison unit calculates average values of gray values of the current value document and the standard value document according to the first infrared characteristic data and the second infrared characteristic data, compares the average values to obtain an average comparison value, determines whether the average comparison value meets a set requirement, and obtains an average legal/illegal signal $S_{d2}$; the variance comparison unit calculates variances of gray values of the current value document and the standard value document according to the first infrared characteristic data and the second infrared characteristic data, compares the variances to obtain a variance comparison value, determines whether the variance comparison value meets a set requirement, and obtains a variance legal/illegal signal $S_{d3}$. The fake determination unit 623 determines ether the current value document is fake according to the gradient legal/illegal signal $S_{d1}$, the average legal/illegal signal $S_{d2}$ and/or the variance legal/illegal signal $S_{d3}$, and Obtains a legal/illegal document signal $S_d$ for the current value document. When the gradient legal/illegal signal $S_{d1}$, the average legal/illegal signal $S_{d2}$ and/or the variance legal/illegal signal $S_{d3}$ are all legal signals, the current value document is a legal document, otherwise, the current value document is an illegal document.

Figure 1:
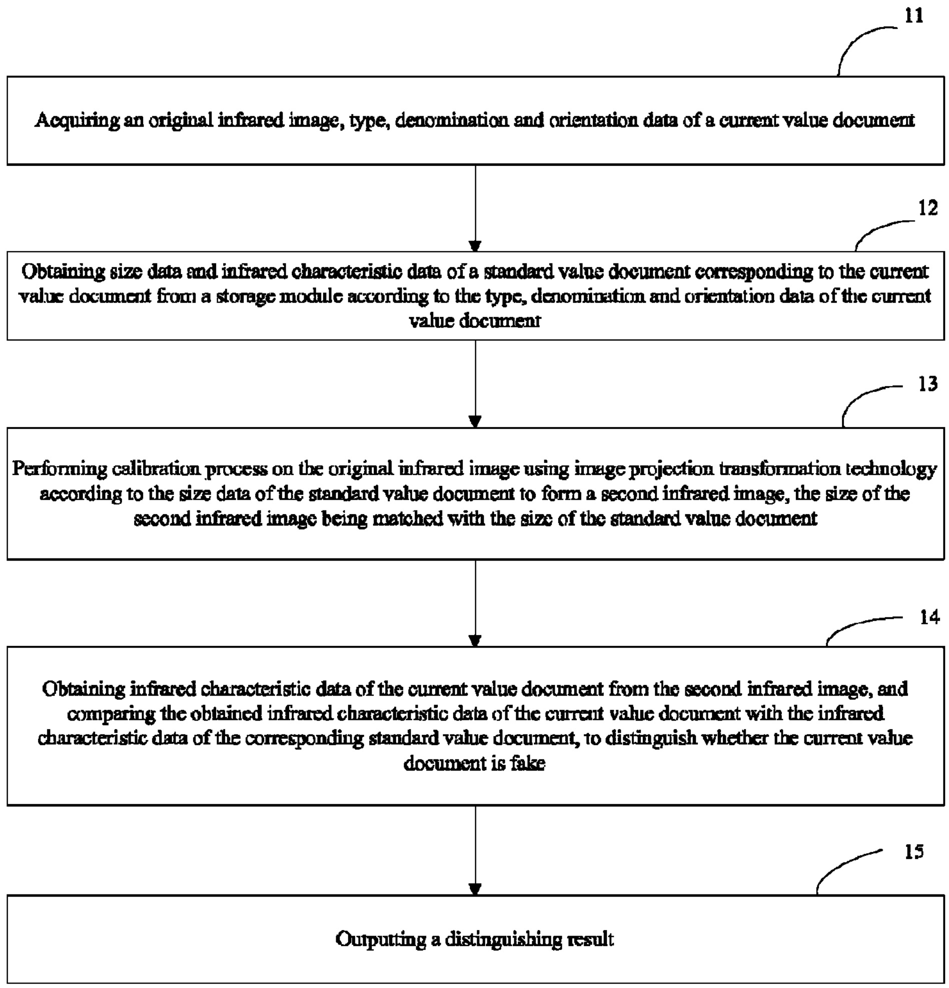
FIG. 1 is a flow chart of a value document distinguishing method according to present invention.
Figure 2:
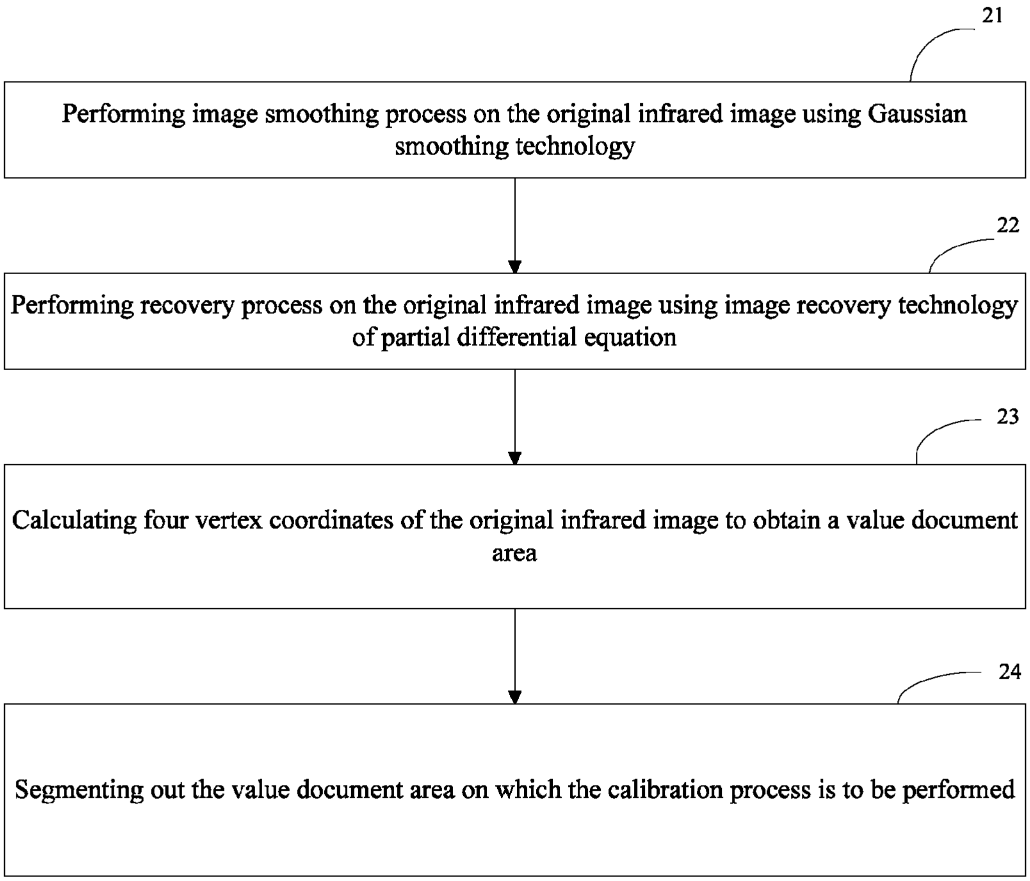
FIG. 2 is a flow chart for performing pre-process on the original infrared image in the value document distinguishing method according to the present invention.
Figure 3:
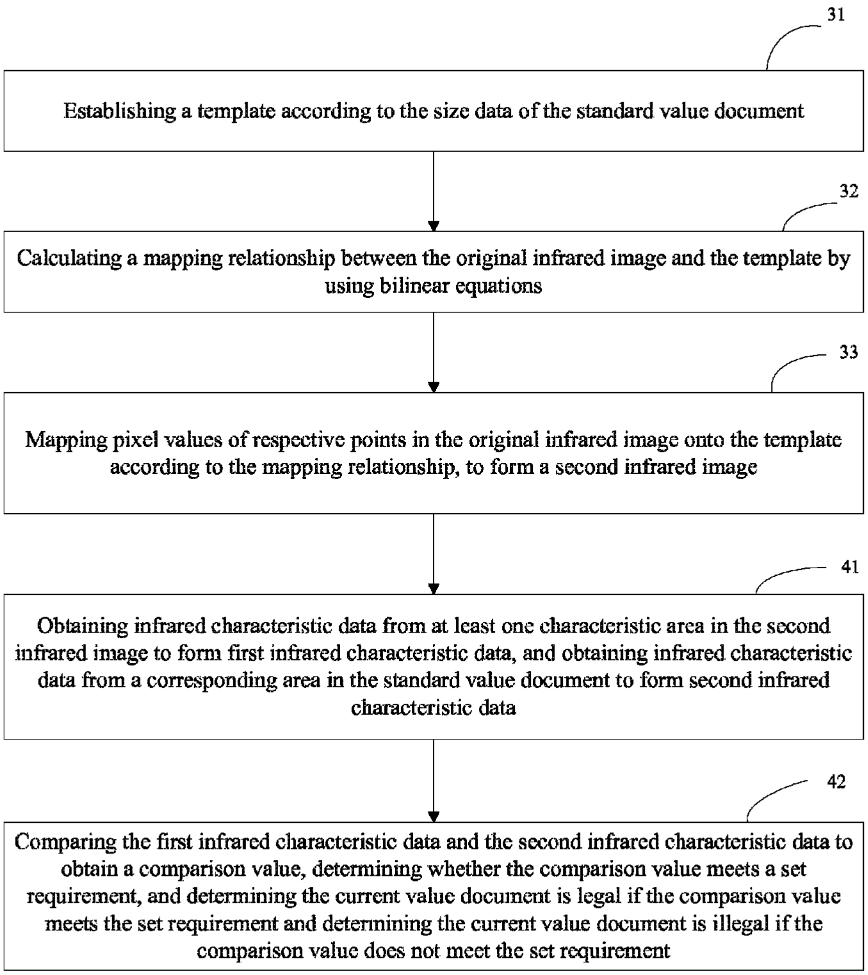
FIG. 3 is a flow chart for performing calibration process on the original infrared image and distinguishing whether the original infrared image is fake in the value document distinguishing method according to the present invention.

In conjunction with FIGS. 1-3, notes for the application of the value document distinguishing device of FIGS. 4-8 are set forth as follow:

(1) the infrared camera device 511 acquires the original infrared image $P_0$ of the current value document. The infrared camera device 511 may acquire a two-dimension image of the current value document from any angle, i.e., $0<\theta\leq 90°$, where θ is a shooting angle. The preferable shooting angle of the present invention is $\theta>60°$.

(2) the pre-process module 52 performs pre-process on the captured original infrared image $P_0$, and the specific steps are as follow:

I. the image de-noise unit 521 performs smoothing process on the captured original infrared image $P_0$ using Gaussian smoothing technology, to obtain a smoothing processed original infrared image $P_{11}$.

II. the image recovery unit 522 performs recovery process on the smoothing processed original infrared image $P_{11}$ using image recovery technology of partial differential equation, to obtain a recovery processed original infrared image $P_{12}$.

III. the image locating unit 523 calculates four vertex coordinates of the original infrared image $P_{12}$ to obtain the value document area $P_{13}$. Specifically, the following steps are included:

supposing that W represents the width of the original infrared image for the current value document, H represents height, x represents x-coordinate of the image, and y represents y-coordinate of the image; searching for a top edge point on line x=W/2 from up to down, and searching for a lower edge point from down to up, designating the top edge point as $P_0^U=(x_0^U, y_0^U)$, and designating the lower edge point as $P_0^D=(x_0^D, y_0^D)$; searching for edge points on lines $x=x_0^U\pm\Delta w$ respectively, the search range of y is $[y_0^U-\Delta L, y_0^U+\Delta L]$, where Δw and ΔL are preset searching step, designating the searched edge points as $P_{-1}^U=(x_{-1}^U, y_{-1}^U)$ and $P_1^U=(x_1^U, y_1^U)$;

repeating the process by taking $P_1^U$ and $P_1^U$ as origin, until there is no boundary point in the search range, and all edge points obtained in the whole process constituting a sequence, which is a top edge point sequence:

$$P_U=(P_{-M_U}^U, P_{-M_U+1}^U, \ldots, P_{-1}^U, P_0^U, P_1^U, \ldots, P_{N_U-1}^U, P_{N_U}^U);$$

in the same way, obtaining the lower edge point sequence:

$$P_D=(P_{-M_D}^D, P_{-M_D+1}^D, \ldots, P_{-1}^D, P_0^D, P_1^D, \ldots, P_{N_D-1}^D, P_{N_D}^D);$$

performing the least square linear fitting using the edge points $P_U$ and $P_D$, to obtain linear equations $L_U$ and $L_D$ of the top edge and the lower edge; and in the same way, obtaining linear equations $L_L$ and $L_R$ of left edge and right edge; obtaining four vertex coordinates of the original infrared image of the current value document by calculating intersection points between adjacent lines, and thus determining the specific location of the value document, where the quadrilateral area formed by the four vertex coordinates is the value document area $P_{13}$.

IV. the image segmentation unit 524 segments out the value document area $P_{13}$, completes the segmentation process of the original infrared image $P_{12}$, and obtains pre-processed original infrared image $P_1$. The specific steps are as follow: maintaining the pixel values of the infrared image unvaried, and setting the pixel values outside the value document area $P_{13}$ to 0, i.e., segmenting out the value document area $P_{13}$.

(3) the interactive interface 512 receives the type, denomination and orientation data $P_i$ of the current value document inputted by a user based on prompt information, and the data selection unit 61 obtains attribute characteristic data $S_p$ and infrared characteristic data $S_i$ of the standard value document corresponding to the current value document from the storage module 53 according to the type, denomination and orientation data $P_i$ of the current value document.

(4) the projection calibration module 52 is used for performing calibration process on the original infrared image $P_0$ using image projection transformation technology according to the attribute characteristic data $S_p$ of the standard value document to form the second infrared image $P_2$, where the size of the second infrared image $P_2$ is matched with the size in the attribute characteristic data $S_p$ of the standard value document. The specific steps are as follow:

I. the template process unit 541 establishes the template $P_m$ using the attribute characteristic data $S_p$ of the standard value document; the parameter computation unit 542 calculates the mapping relationship between the original infrared image $P_1$ and the template $P_m$ using bilinear equations. The specific steps are as follow:

establishing the mapping relationship of respective coordinates in the original infrared image $P_1$ and the template $P_m$ using bilinear equations:

$$x_1=s(x_0,y_0)=c_1x_O+c_2y_0+c_3x_0y_0+c_4;$$

$$y_1=t(x_0,y_0)=c_5x_0+c_6y_0+c_7x_0y_0+c_8;$$

Designating $x_1$ and $y_1$ as the mapping relationships $s(x_0,y_0)$ and $t(x_0,y_0)$, designating the template $P_m$ as $f(x_0,y_0)$, and designating the original infrared image $P_1$ as $g(x_0,y_0)$. The mapping relationship totally has eight parameters $C_1$ to $C_8$, and the mapping relationship $s(x_0,y_0)$ and $t(x_0,y_0)$ may be determined by determining four pairs of mutually corresponding reference points between the original infrared image and the template (the four vertexes of the template may be used as reference points), establishing eight equations according to coordinates of the four pairs of reference points, and working out the eight parameters of the bilinear equations, i.e. $C_1$ to $C_8$.

II. the pixel substitution unit 543 maps the pixel values of respective points in the original infrared image $P_1$ onto the template $P_m$ according to the mapping relationships $s(x_0,y_0)$ and $t(x_0,y_0)$, and forms the second infrared image $P_2$ after calibration process. The specific steps are as follow:

point $(x_0,y_0)$ on the template f corresponding to point (s(x, y),t(x, y)) on the original infrared image g; obtaining a pixel value of point (s(x,y),t(x, y)) using bilinear interpolation, and mapping the pixel value to point $(x_0,y_0)$ of the corresponding template; setting the pixel value of point $(x_0,y_0)$ on the template f to 0 if the point s(x,y), t(x,y)) is not in the original infrared image g, and obtaining the second infrared image $P_2$.

(5) the comparison process unit 62 obtains the infrared characteristic data of the current value document from the second infrared image $P_2$, compares the obtained characteristic data of the current value document with the infrared characteristic data $S_i$ of the standard value document, and obtains a legal/illegal document signal $S_d$ for the current value document. The specific steps are as follow:

I. the data acquisition unit 621 obtains the infrared characteristic data from at least one infrared characteristic area in the second infrared image $P_2$ to form the first infrared characteristic data, and obtains the infrared characteristic data from a corresponding area in the standard value document to from the second infrared characteristic data.

II. the gradient comparison unit 631 calculates a gradient value $G_\Omega(x,y)$ of gray value of the current value document and a gradient value $G_0(x,y)$ of gray value of the corresponding standard value document according to the first characteristic data and the second infrared characteristic data, calculates the number $N_g$ of $G_\Omega(x,y)$ that meets $G_\Omega(x,y)>TH_g$, calculates the number $N_0$ of $G_0(x,y)$ that meets $G_0(x,y)>TH_g$, where $TH_g$ is a gradient threshold, $1.0<TH_g<25.0$; calculates a gradient comparison value N, $N=N_g/N_0$; determines the magnitude of the gradient comparison value N, determines that the current value document meets a gradient rule if $0.95\leq N\leq 1.05$, or otherwise determines that the current document does not meet the gradient rule, and outputs a corresponding gradient legal/illegal signal $S_{d1}$.

III. the average value comparison unit calculates an average value $M_\Omega$ of gray value of the current value document and an average value $M_0$ of gray value of the corresponding standard value document according to the first characteristic data and the second infrared characteristic data, calculates an average comparison value $M=M_g/M_0$, determines the magnitude of M, determines that the current value document meets an average rule if $0.90\leq M\leq 1.10$, or otherwise determines that the current document does not meet the average rule, and outputs a corresponding average legal/illegal signal $S_{d2}$.

IV. the variance comparison unit calculates a variance $V_\Omega$ of gray value of the current value document and a variance $V_0$ of gray value of the corresponding standard value document according to the first characteristic data and the second infrared characteristic data, calculates a variance comparison value $V=V_g/V_0$, determines the magnitude of V, determines that the current value document meets a variance rule if $0.80\leq v\leq 1.25$ or otherwise determines that the current document does not meet the variance rule, and outputs a corresponding variance legal/illegal signal $S_{d3}$.

V. the fake determination unit 623 determines whether the current value document is fake according to the gradient legal/illegal signal $S_{d1}$, the average legal/illegal signal $S_{d2}$ and the variance legal/illegal signal $S_{d3}$, and obtains a legal/illegal document signal $S_d$ of the current value document. If the legal/illegal signals $S_{i1}$, $S_{i2}$, $S_{i3}$ are all legal signals, the current value document is a legal document, and a legal document signal is outputted, otherwise, an illegal document signal is outputted.

(6) the output module 56 outputs the legal/illegal document signal $S_d$ inputted by the fake determination unit 623 to a display and/or a warning device, and completes the distinguishing of the current value document.

From the above, a method for distinguishing a value document can be concluded. Referring to FIG. 1, the distinguishing method includes the following steps:

(1) acquiring an original infrared image, type, denomination and orientation data of a current value document;

(2) Obtaining size data and infrared characteristic data of a standard value document corresponding to the current value document from a storage module according to the type, denomination and orientation data of the current value document;

(3) performing calibration process on the original infrared image using image projection transformation technology according to the size data of the standard value document to form a second infrared image, the size of the second infrared image being matched with the size of the standard value document;

(4) obtaining infrared characteristic data of the current value document from the second infrared image, and comparing the obtained infrared characteristic data of the current value document with the infrared characteristic data of the corresponding standard value document, to distinguish whether the current value document is fake; and (5) outputting a distinguishing result.

Preferably, step (1) specifically includes the following steps:

(11) capturing the original infrared image of the current value document; and

(12) obtaining the type, denomination and orientation data of the current value document by way of comparing the original infrared image of the current value document with data stored in the storage module for identification or by way of inputting from an interactive interface.

Preferably, referring to FIG. 2, in step 2, the original infrared image needs to be pre-processed before performing calibration process on the original infrared image, which specifically includes the following steps:

(11a) performing image smoothing process on the original infrared image using Gaussian smoothing technology;

(11b) performing recovery process on the original infrared image using image recovery technology of partial differential equation;

(11c) calculating four vertex coordinates of the original infrared image to obtain a value document area; and (11d) segmenting out the value document area on which the calibration process is to be performed.

Preferably, referring to FIG. 3, step (3) specifically includes the following steps:

(31) establishing a template according to the size data of the standard value document;

(32) calculating a mapping relationship between the original infrared image and the template by using bilinear equations; and

(33) mapping pixel values of respective points in the original infrared image onto the template according to the mapping relationship, to firm a second infrared image.

Preferably, referring to FIG. 3, step (4) specifically includes the following steps:

(41) obtaining infrared characteristic data from at least one characteristic area in the second infrared image to form first infrared characteristic data, and obtaining infrared characteristic data from a corresponding area in the standard value document to form second infrared characteristic data; and

(42) comparing the first infrared characteristic data and the second infrared characteristic data to obtain a comparison value, determining whether the comparison value meets a set requirement, and determining the current value document is legal if the comparison value meets the set requirement and determining the current value document is illegal if the comparison value does not meet the set requirement.

Preferably, the infrared characteristic data includes at least one of the following values: a gradient characteristic value of gray value of the infrared image, an average value of gray value of the infrared image, and a variance of gray value of the infrared image.

Specifically, when the infrared characteristic data is the gradient characteristic value of gray value of the infrared image, the determining includes:

(51) calculating a gradient value $G_\Omega(x,y)$ of gray value of the current value document and a gradient value $G_0(x,y)$ of gray value of the corresponding standard value document;

(52) calculating the number $N_g$ of $G_\Omega(x,y)$ that meets $G_\Omega(x,y)>TH_g$, calculating the number $N_0$ of $G_0(x,y)$ that meets $G_0(x,y)>TH_g$, wherein $TH_g$ is a gradient threshold, $1.0<TH_g<25.0$;

(53) calculating a gradient comparison value N, $N=N_g/N_0$; and

(54) determining the magnitude of the gradient comparison value N, determining that the current value document meets a gradient rule if $0.95\leq N\leq 1.05$, or otherwise determining that the current value document does not meet the gradient rule, and then outputting a corresponding gradient legal/illegal signal.

Specifically, when the infrared characteristic data is the average value of gray value of the infrared image, the determining includes:

(61) calculating an average value $M_\Omega$ of gray value of the current value document and an average value $M_0$ of gray value of the corresponding standard value document;

(62) calculating an average comparison value M, $M=M_g/M_0$; and

(63) determining the magnitude of the comparison value determining that the current value document meets an average rule if $0.90\leq M\leq 1.10$, or otherwise determining that the current value document does not meet the average rule, and then outputting a corresponding average legal/illegal signal.

Specifically, when the infrared characteristic data is the variance of gray value of the infrared image, the determining includes:

(71) calculating a variance $V_\Omega$ of gray value of the current value document and a variance $V_0$ of gray value of the corresponding standard value document;

(72) calculating a variance comparison value V, $V=V_g/V_0$; and

(73) determining the magnitude of V, determining that the current value document meets a variance rule if $0.80\leq V\leq 1.25$, or otherwise determining that the current value document does not meet the variance rule, and then outputting a corresponding variance legal/illegal signal.

What is claimed is:

1. A method for distinguishing a value document, comprising the following steps:

step (1) acquiring an original infrared image, type, denomination and orientation data of a current value document;

step (2) Obtaining size data and infrared characteristic data of a standard value document corresponding to the current value document from a storage module according to the type, denomination and orientation data of the current value document;

step (3) performing calibration process on the original infrared image using image projection transformation technology according to the size data of the standard value document to form a second infrared image, the size of the second infrared image being matched with the size of the standard value document;

step (4) obtaining infrared characteristic data of the current value document from the second infrared image, and comparing the obtained infrared characteristic data of the current value document with the infrared characteristic data of the corresponding standard value document, to distinguish whether the current value document is fake, and step (5), outputting a distinguishing result; wherein step (1) comprises the following steps: step (1a), capturing the original infrared image of the current value document; step (1b), obtaining the type, denomination and orientation data of the current value document by way of comprising the original infrared image of the current value document with data stored in the storage module for identification or by way of inputting from an interactive interface.

2. The method for distinguishing the value document according to claim 1, wherein in the step (2), the original infrared image needs to be pre-processed before performing the calibration process on the original infrared image, and the step (2) comprises the following steps:

step (2a), performing image smoothing process on the original infrared image using Gaussian smoothing technology;

step (2b), performing recovery process on the original infrared image using image recovery technology of partial differential equation;

step (2c), calculating four vertex coordinates of the original infrared image to obtain a value document area; and step (2d), segmenting out the value document area on which the calibration process is to be performed.

3. The method for distinguishing the value document according to claim 1, wherein the step (3) comprises the following steps:

step (3a), establishing a template according to the size data of the standard value document;

step (3b), calculating a mapping relationship between the original infrared image and the template by using bilinear equations; and step (3c), mapping pixel values of respective points in the original infrared image onto the template according to the mapping relationship, to for a second infrared image.

4. The method for distinguishing the value document according to claim 1, wherein the step (4) comprises the following steps:

step (4a), obtaining infrared characteristic data from at least one characteristic area in the second infrared image to form first infrared characteristic data, and obtaining infrared characteristic data from a corresponding area in the standard value document to form second infrared characteristic data; and step (4b) comparing the first infrared characteristic data and the second infrared characteristic data to obtain a comparison value, determining whether the comparison value meets a set requirement, and determining the current value document is legal if the comparison value meets the set requirement and determining the current value document is illegal if the comparison value does not meet the set requirement.

5. The method for distinguishing the value document according claim 4, wherein the infrared characteristic data includes at least one of the following values: a gradient characteristic value of gray value of the infrared image, an average value of gray value of the infrared image, and a variance of gray value of the infrared image.

6. The method for distinguishing the value document according claim 5, wherein when the infrared characteristic data is the gradient characteristic value of gray value of the infrared image, the determining includes:

calculating a gradient value Ga(x,y) of gray value of the current value document and a gradient value G0(x,y) of gray value of the corresponding standard value document;

calculating the number Ng of Ga(x,y) that meets Ga(x,y)>THg, calculating the number No of G0(x,y) that meets G0(x,y)>THg, wherein THg is a gradient threshold, 1.0 25.0;

calculating a gradient comparison value N, N=Ng/N0; and determining the magnitude of the gradient comparison value N, determining that the current value document meets a gradient rule if $0.95<N<1.05$, or otherwise determining that the current value document does not meet the gradient rule, and then outputting a corresponding gradient legal/illegal signal.

7. The method for distinguishing the value document according claim 5, wherein when the infrared characteristic data is the average value of gray value of the infrared image, the determining includes:

calculating an average value Ma of gray value of the current value document and an average value M0 of gray value of the corresponding standard value document;

calculating an average comparison value M, M=Mg/Mo; and determining the magnitude of the comparison value M, determining that the current value document meets an average rule if $0.90<M<1.10$, or otherwise determining that the current value document does not meet the average rule, and then outputting a corresponding average legal/illegal signal.

8. The method for distinguishing the value document according claim 5, wherein when the infrared characteristic data is the variance of gray value of the infrared image, the determining includes:

calculating a variance Vn of gray value of the current value document and a variance V0 of gray value of the corresponding standard value document;

calculating a variance comparison value V, V=Vg/V0; and determining the magnitude of V, determining that the current value document meets a variance rule if $0.80<V<1.25$, or otherwise determining that the current value document does not meet the variance rule, and then outputting a corresponding variance legal/illegal signal.

9. A value document distinguishing device for distinguishing whether a current value document is fake, wherein the value document distinguishing device comprises:

a collection module for obtaining an original infrared image, type, denomination and orientation data of the current value document;

a storage module for storing size data and infrared characteristic data of a standard value document;

a projection calibration module for performing calibration process on the original infrared image using image projection transformation technology according to the size data of the standard value document to form a second infrared image, the size of the second infrared image being matched with the size of the standard value document;

a process module for obtaining size data and infrared characteristic data of the standard value document corresponding to the current value document from the storage module according to the type, denomination and orientation data of the current value document; obtaining infrared characteristic data of the current value document from the second infrared image, and comparing the obtained infrared characteristic data of the current value document with the infrared characteristic data of the standard value document, to obtain a legal/illegal document signal for the current value document;

an output module for outputting the legal/illegal document signal; and a control module for controlling and coordinating data transfer among respective modules in the value document distinguishing device;

wherein the collection module comprises:

an infrared camera device for capturing and obtaining the original infrared image of the current value document; and an interactive interface for capturing and obtaining the type, denomination and orientation data of the current value document inputting from outside.

10. The value document distinguishing device according to claim 9, wherein the collection module comprises:

an infrared camera device for capturing and obtaining the original infrared image of the current value document; and a comparison and identification unit for comparing the original infrared image of the current value document with the infrared characteristic data of the standard value document stored in the storage module to obtain the type, denomination and orientation data of the current value document.

11. The value document distinguishing device according to claim 9, wherein the value document distinguishing device further comprises a pre-process module for pre-processing the original infrared image, and the pre-process module comprises:

an image de-noise unit for performing image smoothing process on the original infrared image;

an image recovery unit tier performing recovery process on the original infrared image;

an image locating unit for calculating four vertex coordinates of the original infrared image to obtain a value document area; and an image segmentation unit for segmenting out the value documents area on which the calibration process is to be performed.

12. The valve document distinguishing device according to claim 9, wherein the projection calibration module comprises:

a template process unit for establishing a template using the size data of the standard value document;

a parameter computation unit for calculating a mapping relationship between the original infrared image and the template by using bilinear equations; and a pixel substitution unit for mapping pixel values of respective points in the original infrared image onto the template according to the mapping relationship, and forming the is second infrared image after the calibration process.

13. The value document distinguishing device according to claim 9, wherein the process module comprises:

a data selection unit for obtaining the size data and the infrared characteristic data of the standard value document corresponding to the current value document from the storage module according to the type, denomination and orientation data of the current value document; and a comparison process unit for obtaining the infrared characteristic data of the current value document from the second infrared image, and comparing the obtained infrared characteristic data of the current value document with the infrared characteristic data of the standard value document to obtain a legal/illegal document signal for the current value document.

14. The value document distinguishing device according to claim 13, wherein the comparison process unit comprises:

a data acquisition unit for obtaining the infrared characteristic data from at least one infrared characteristic area in the second infrared image to form first infrared characteristic data, and obtaining the infrared characteristic data from a corresponding area in the standard value document to form second infrared characteristic data;

a data comparison unit which comprises at least one of the following three units:

a gradient comparison unit for calculating gradient characteristic values of gray values of the current value document and the standard value document according to the first infrared characteristic data and the second infrared characteristic data, comparing the gradient characteristic values to obtain a gradient comparison value, determining whether the gradient comparison value meets a set requirement, and obtaining a gradient legal/illegal signal;

an average value comparison unit for calculating average values of gray values of the current value document and the standard value document according to the first infrared characteristic data and the second infrared characteristic data, comparing the average values to obtain an average comparison value, determining whether the average comparison value meets a set requirement, and obtaining an average legal/illegal signal; and a variance comparison unit for calculating variances of gray values of the current value document and the standard value document according to the first infrared characteristic data and the second infrared characteristic data, comparing the variances to obtain a variance comparison value, determining whether the variance comparison value meets a set requirement, and obtaining a variance legal/illegal signal; and a fake determination unit for determining whether the current value document is fake according to the gradient legal/illegal signal, the average legal/illegal signal and/or the variance legal/illegal signal, and obtaining the legal/illegal document signal for the current value document.

* * * * *

UNITED STATES PATENT AND TRADEMARK OFFICE

CERTIFICATE OF CORRECTION

PATENT NO. : 9,014,459 B2
APPLICATION NO. : 13/883994
DATED : April 21, 2015
INVENTOR(S) : Tuowen Xiang It is certified that error appears in the above-identified patent and that said Letters Patent is hereby corrected as shown below:

In the Specification

Column 3, line 56, delete "$G_{\Omega}(x)$" and insert --$G_{\Omega}(x,y)$--.

In the Claims

Column 15, line 17-18, delete "1.0 25.0" and insert --$1.0<TH_g<25.0$--.

Column 16, line 45, delete "tier" and insert --for--.

Signed and Sealed this
First Day of December, 2015

Michelle K. Lee
*Director of the United States Patent and Trademark Office*